United States Patent
Keller (10) Patent No.: US 6,434,640 B1
(45) Date of Patent: Aug. 13, 2002

(54) UNLOAD COUNTER ADJUST LOGIC FOR A RECEIVER BUFFER

(75) Inventor: James B. Keller, Palo Alto, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/320,134

(22) Filed: May 25, 1999

(51) Int. Cl.$^7$ .................................................. G06F 3/00
(52) U.S. Cl. ........................... 710/52; 710/29; 711/167
(58) Field of Search ............................. 710/20, 29, 33, 710/52, 54, 310; 74/154, 167, 169

(56) References Cited

U.S. PATENT DOCUMENTS

| | | |
|---|---|---|
| 4,419,739 A | 12/1983 | Blum |
| 4,866,310 A | 9/1989 | Ando et al. |
| 5,045,725 A | 9/1991 | Sasaki et al. |
| 5,224,129 A | 6/1993 | Lueker et al. |
| 5,388,216 A * | 2/1995 | Oh ............................... 710/29 |
| 5,448,715 A | 9/1995 | Lelm et al. |
| 5,640,605 A | 6/1997 | Johnson et al. |
| 5,768,529 A | 6/1998 | Nikel et al. |
| 5,867,731 A | 2/1999 | Williams et al. |
| 5,999,023 A | 12/1999 | Kim |
| 6,067,629 A | 5/2000 | Murray et al. |
| 6,269,413 B1 | 7/2001 | Sherlock |

OTHER PUBLICATIONS

AMD Athlon™ Processor Technical Brief, Dec. 1999, ©Advanced Micro Devices, Inc., pp. 1–7.
AMD Athlon™ Processor Module Data Sheet, Jun. 2000, ©Advanced Micro Devices, Inc., pp. 1–64.
LXT9785 Data Sheet, Sep. 2000, ©Level One Communications, Inc., pp. 1–105.

* cited by examiner

*Primary Examiner*—Matthew Kim
*Assistant Examiner*—C. P. Chace
(74) *Attorney, Agent, or Firm*—Conley, Rose & Tayon, PC; Lawrence J. Merkel (57) ABSTRACT

A computer system employs a distributed set of links between processing nodes (each processing node including at least one processor). Each link includes a clock signal which is transmitted with and in the same direction as the signals carrying information on the link. The line carrying the clock signal may be matched to the information lines, controlling skew and transport time differences to allow for high frequency operation. Because the clock signals at a transmitter and a receiver may not have a common source, a receive buffer may be employed. Data transmitted across the link is stored into the receive buffer responsive to the transmitter clock signal (e.g. by maintaining a load pointer controlled according to the transmitter clock), and is removed from the buffer responsive to the receiver clock signal (e.g. by maintaining an unload pointer controlled according to the receiver clock). The buffer includes sufficient entries for data to account for clock uncertainties (e.g. skew and jitter). Additionally, the receiver includes unload pointer adjust logic which monitors the transmitter clock signal and the receiver clock signal for differences (e.g. differences in frequency). The unload pointer adjust logic makes adjustments to the unload pointer to account for the differences in the clock signal, and hence to maintain integrity of the data transmitted by preventing the load and unload pointers from overrunning each other in the buffer.

25 Claims, 6 Drawing Sheets

UNLOAD COUNTER ADJUST LOGIC FOR A RECEIVER BUFFER

BACKGROUND OF THE INVENTION

1. Field of the Invention

This invention is related to the field of microprocessors and computer systems and, more particularly, to receive buffer control circuitry.

2. Description of the Related Art

Generally, personal computers (PCs) and other types of computer systems have been designed around a shared bus system for accessing memory. One or more processors and one or more input/output (I/O) devices are coupled to memory through the shared bus. The I/O devices may be coupled to the shared bus through an I/O bridge which manages the transfer of information between the shared bus and the I/O devices, while processors are typically coupled directly to the shared bus or are coupled through a cache hierarchy to the shared bus.

Unfortunately, shared bus systems suffer from several drawbacks. For example, since there are multiple devices attached to the shared bus, the bus is typically operated at a relatively low frequency. The multiple attachments present a high capacitive load to a device driving a signal on the bus, and the multiple attach points present a relatively complicated transmission line model for high frequencies. Accordingly, the frequency remains low, and bandwidth available on the shared bus is similarly relatively low. The low bandwidth presents a barrier to attaching additional devices to the shared bus, as performance may be limited by available bandwidth.

Another disadvantage of the shared bus system is a lack of scalability to larger numbers of devices. As mentioned above, the amount of bandwidth is fixed (and may decrease if adding additional devices reduces the operable frequency of the bus). Once the bandwidth requirements of the devices attached to the bus (either directly or indirectly) exceeds the available bandwidth of the bus, devices will frequently be stalled when attempting access to the bus. Overall performance may be decreased.

Another problem affecting scalability of the shared bus system is the need to distribute a single synchronous clock to the devices attached to the bus. The clock signal is used to determine when to sample the bus lines for a value and when to drive the bus lines with that value. Accordingly, the amount of skew experienced by the clock signal throughout the system must be minimized, and must be accounted for in the frequency at which the bus operates.

SUMMARY OF THE INVENTION

The problems outlined above are in large part solved by a computer system as described herein. The computer system employs a distributed set of links between processing nodes (each processing node including at least one processor). Each link includes a clock signal which is transmitted with and in the same direction as the signals carrying information on the link. The line carrying the clock signal may be matched to the information lines, controlling skew and transport time differences to allow for high frequency operation. Since the links each carry their own clock, distributing a single clock signal throughout the system with minimum skew may be avoided.

Because the clock signals at a transmitter and a receiver may not have a common source, a receive buffer may be employed Data transmitted across the link is stored into the receive buffer responsive to the transmitter clock signal (e.g. by maintaining a load pointer controlled according to the transmitter clock), and is removed from the buffer responsive to the receiver clock signal (e.g. by maintaining an unload pointer controlled according to the receiver clock). The buffer includes sufficient entries for data to account for clock uncertainties (e.g. skew and jitter). Additionally, the receiver includes unload pointer adjust logic which monitors the transmitter clock signal and the receiver clock signal for differences (e.g. differences in frequency). The unload pointer adjust logic makes adjustments to the unload pointer to account for the differences in the clock signal, and hence to maintain integrity of the data transmitted by preventing the load and unload pointers from overrunning each other in the buffer.

Broadly speaking, an interface logic is contemplated. The interface logic includes a receive buffer, a load counter, an unload counter and an unload counter adjust logic. Coupled to receive data, the receive buffer includes a plurality of storage locations. Each of the plurality of storage locations is capable of storing the data. Coupled to the receive buffer and to receive a first clock signal, the load counter is configured to provide a first pointer which selects one of the plurality of storage locations to store the data. The load counter is further configured to modify the first pointer responsive to the first clock signal. The unload counter is coupled to the receive buffer and to receive a second clock signal, and the load counter is configured to provide a second pointer which selects one of the plurality of storage locations to transmit data out of the receive buffer. Furthermore, the unload counter is configured to modify the second pointer responsive to the second clock signal. Coupled to the unload counter and to receive the first clock signal and the second clock signal, the unload counter adjust logic is configured to modify the second pointer responsive to differences between the first and second clock signals.

Additionally, a method for operating a receive buffer is contemplated. The method includes modifying a load pointer responsive to a first clock signal, modifying an unload pointer responsive to a second clock signal, detecting differences between the first clock signal and the second clock signal, and modifying the unload pointer responsive thereto. Moreover, a computer system is contemplated. The computer system includes a first processing node and a second processing node. The first processing node includes an interface logic comprising a receive buffer, a load counter, an unload counter, and an unload counter adjust logic. The receive buffer is coupled to receive data and includes a plurality of storage locations. Each of the plurality of storage locations is capable of storing the data. Coupled to the receive buffer and to receive a first clock signal, the load counter is configured to provide a first pointer which selects one of the plurality of storage locations to store the data. The load counter is configured to modify the first pointer responsive to the first clock signal. The unload counter is coupled to the receive buffer and to receive a second clock signal, and is configured to provide a second pointer which selects one of the plurality of storage locations to transmit data out of the receive buffer. Additionally, the unload counter is configured to modify the second pointer responsive to the second clock signal. The unload counter adjust logic is coupled to the unload counter and to receive the first clock signal and the second clock signal. The unload counter adjust logic is configured to modify the second pointer responsive to differences between the first and second clock signals. The second processing node is coupled to the first processing node, and the second processing node is configured to provide the first clock signal and the data.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
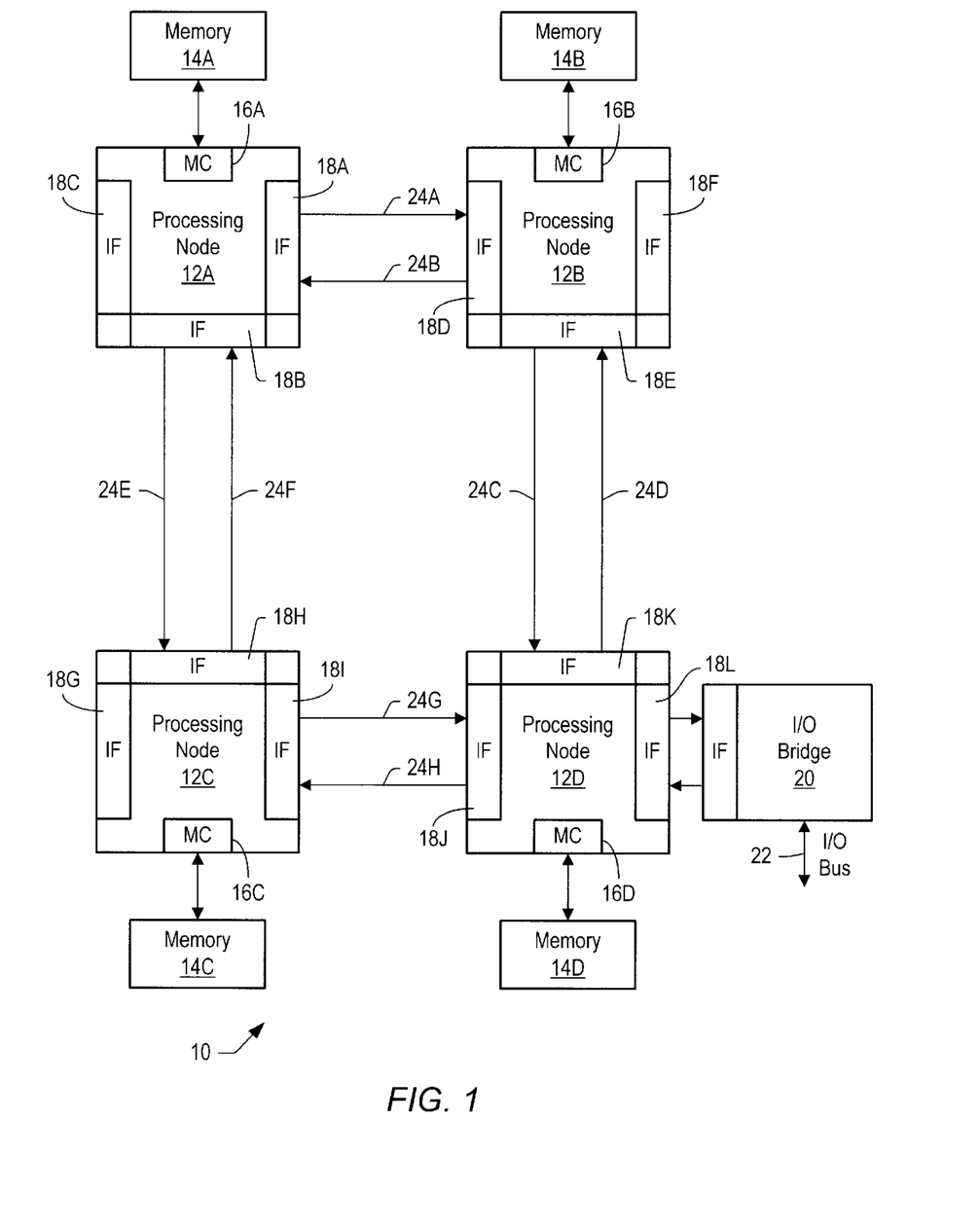
FIG. 1 is a block diagram of one embodiment of a computer system.

Turning now to FIG. 1, one embodiment of a computer system 10 is shown. Other embodiments are possible and contemplated. In the embodiment of FIG. 1, computer system 10 includes several processing nodes 12A, 12B, 12C, and 12D. Each processing node is coupled to a respective memory 14A–14D via a memory controller 16A–16D included within each respective processing node 12A–12D. Additionally, processing nodes 12A–12D include interface logic used to communicate between the processing nodes 12A–12D. For example, processing node 12A includes interface logic 18A for communicating with processing node 12B, interface logic 18B for communicating with processing node 12C, and a third interface logic 18C for communicating with yet another processing node (not shown). Similarly, processing node 12B includes interface logic 18D, 18E, and 18F; processing node 12C includes interface logic 18G, 18H, and 18I; and processing node 12D includes interface logic 18J, 18K, and 18L. Processing node 12D is coupled to communicate with an I/O bridge 20 via interface logic 18L. Other processing nodes may communicate with other I/O bridges in a similar fashion. I/O bridge 20 is coupled to an I/O bus 22.

Processing nodes 12A–12D implement a packet-based link for inter-processing node communication. In the present embodiment, the link is implemented as sets of unidirectional lines (e.g. lines 24A are used to transmit packets from processing node 12A to processing node 12B and lines 24B are used to transmit packets from processing node 12B to processing node 12A). Other sets of lines 24C–24H are used to transmit packets between other processing nodes as illustrated in FIG. 1. The link may be operated in a cache coherent fashion for communication between processing nodes or in a noncoherent fashion for communication between a processing node and an I/O bridge. Additionally, the link may be operated in a noncoherent fashion for connection between one or more I/O devices in a daisy chain configuration. The configuration may be headed by a host bridge for communicating on the coherent links, which may be integrated into processing node 12D or separate from processing node 12D (as with I/O bridge 20). It is noted that a packet to be transmitted from one processing node to another may pass through one or more intermediate nodes. For example, a packet transmitted by processing node 12A to processing node 12D may pass through either processing node 12B or processing node 12C as shown in FIG. 1. Any suitable routing algorithm may be used. Other embodiments of computer system 10 may include more or fewer processing nodes then the embodiment shown in FIG. 1.

The interconnect of processing nodes as illustrated in FIG. 1 may be more scalable than a shared bus system. As processing nodes are added, they are interconnected with existing processing nodes using currently unused interface logic. Accordingly, frequencies of operation may be unaffected by the increase in number of processing nodes. Furthermore, each set of lines 24 used to communicate between two processing nodes includes the same number of connections regardless of the number of processing nodes within computer system 10.

Processing nodes 12A–12D, in addition to a memory controller and interface logic, may include one or more processors. Broadly speaking, a processing node comprises at least one processor and may optionally include a memory controller for communicating with a memory and other logic as desired.

Memories 14A–14D may comprise any suitable memory devices. For example, a memory 14A–14D may comprise one or more RAMBUS DRAMs (RDRAMs), synchronous DRAMs (SDRAMs), static RAM, etc. The address space of computer system 10 is divided among memories 14A–14D. Each processing node 12A–12D may include a memory map used to determine which addresses are mapped to which memories 14A–14D, and hence to which processing node 12A–12D a memory request for a particular address should be routed. In one embodiment, the coherency point for an address within computer system 10 is the memory controller 16A–16D coupled to the memory storing bytes corresponding to the address. In other words, the memory controller 16A–16D is responsible for ensuring that each memory access to the corresponding memory 14A–14D occurs in a cache coherent fashion. Memory controllers 16A–16D may comprise control circuitry for interfacing to memories 14A–14D. Additionally, memory controllers 16A–16D may include request queues for queuing memory requests.

Generally, interface logic 18A–18L may comprise a variety of buffers for receiving packets from the link and for buffering packets to be transmitted upon the link. Computer system 10 may employ any suitable flow control mechanism for transmitting packets. For example, in one embodiment, each interface logic 18 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receive interface logic transmits a message to the sending interface logic to indicate that the buffer has been freed. Such a mechanism may be referred to as a "coupon-based" system.

Figure 2:
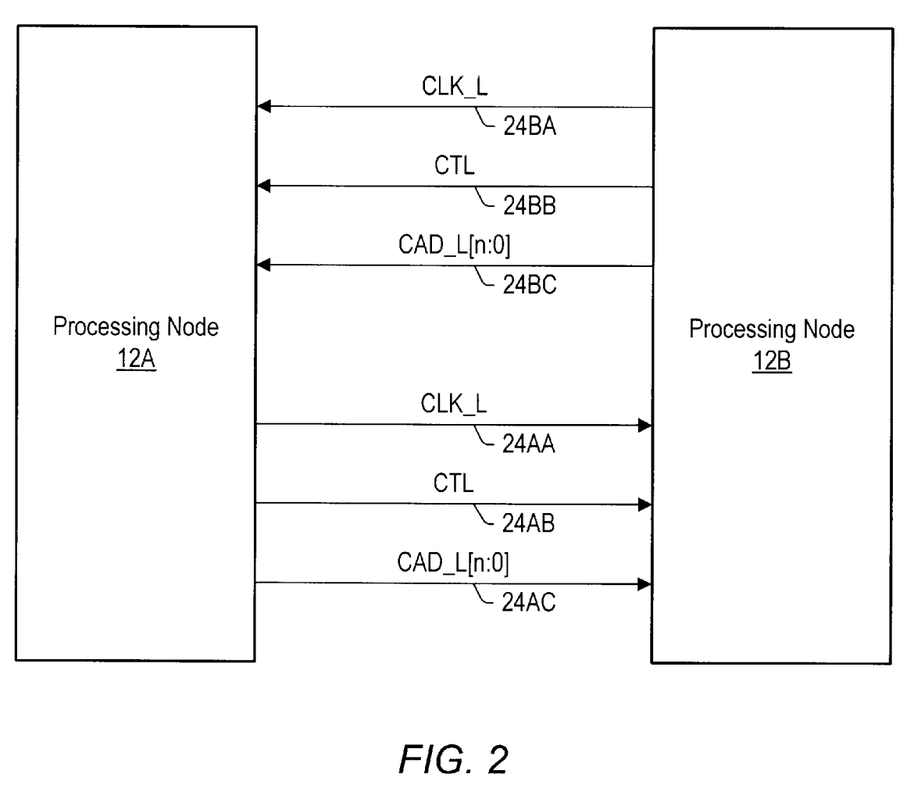
FIG. 2 is a block diagram of two processing nodes illustrated in FIG. 1, highlighting interconnection therebetween in more detail according to one embodiment of the computer system shown in FIG. 1.

Turning next to FIG. 2, a block diagram illustrating processing nodes 12A and 12B is shown to illustrate one embodiment of the links therebetween in more detail. Other embodiments are possible and contemplated. In the embodiment of FIG. 2, lines 24A include a clock line 24AA, a control line 24AB, and a control/address/data bus 24AC. Similarly, lines 24B include a clock line 24BA, a control line 24BB, and a control/address/data bus 24BC.

The clock line transmits a clock signal which indicates a sample point for the control line and the control/address/data bus. In one particular embodiment, data/control bits are transmitted on each edge (i.e. rising edge and falling edge) of the clock signal. Accordingly, two data bits per line may be transmitted per clock cycle. The amount of time employed to transmit one bit per line is referred to herein as a "bit time". The above-mentioned embodiment includes two bit times per clock cycle. A packet may be transmitted across two or more bit times. Multiple clock lines may be used depending upon the width of the control/address/data bus. For example, four clock lines may be used for a 32 bit control/address/data bus (with each byte of the control/address/data bus referenced to a different clock line and the control line referenced to one of the clock lines).

Because the clock signal is transmitted in the same direction as the control and control/address/data signals and because there is a single transmitter and a single receiver attached to the lines, the skew between signals may be controlled (e.g. by matching line characteristics between lines 24AA, 24AB, 24AC and 24AD) and the frequency of operation may be relatively high. The clock signal is used by the receiving logic to sample the control and control/address/data lines, and the sampled information may be latched internally.

The control line indicates whether or not the data transmitted upon the control/address/data bus is either a bit time of a control packet or a bit time of a data packet. The control line is asserted to indicate a control packet, and deasserted to indicate a data packet. Certain control packets indicate that a data packet follows. The data packet may immediately follow the corresponding control packet. In one embodiment, other control packets may interrupt the transmission of a data packet. Such an interruption may be performed by asserting the control line for a number of bit times during transmission of the data packet and transmitting the bit times of the control packet while the control line is asserted. Control packets which interrupt a data packet may not indicate that a data packet will be following.

The control/address/data bus comprises a set of lines for transmitting the data/control bits. In one embodiment, the control/address/data bus may comprise 8, 16, or 32 lines. Each processing node or I/O bridge may employ any one of the supported numbers of lines according to design choice. Other embodiments may support other sizes of control/address/data bus as desired.

According to one embodiment, the command/address/data bus lines and the clock line may carry inverted data (i.e. a logical one is represented as a low voltage on the line, and a logical zero is represented as a high voltage). Alternatively, lines may carry non-inverted data (in which a logical one is represented as a high voltage on the line, and logical zero is represented as a low voltage).

Figure 3:
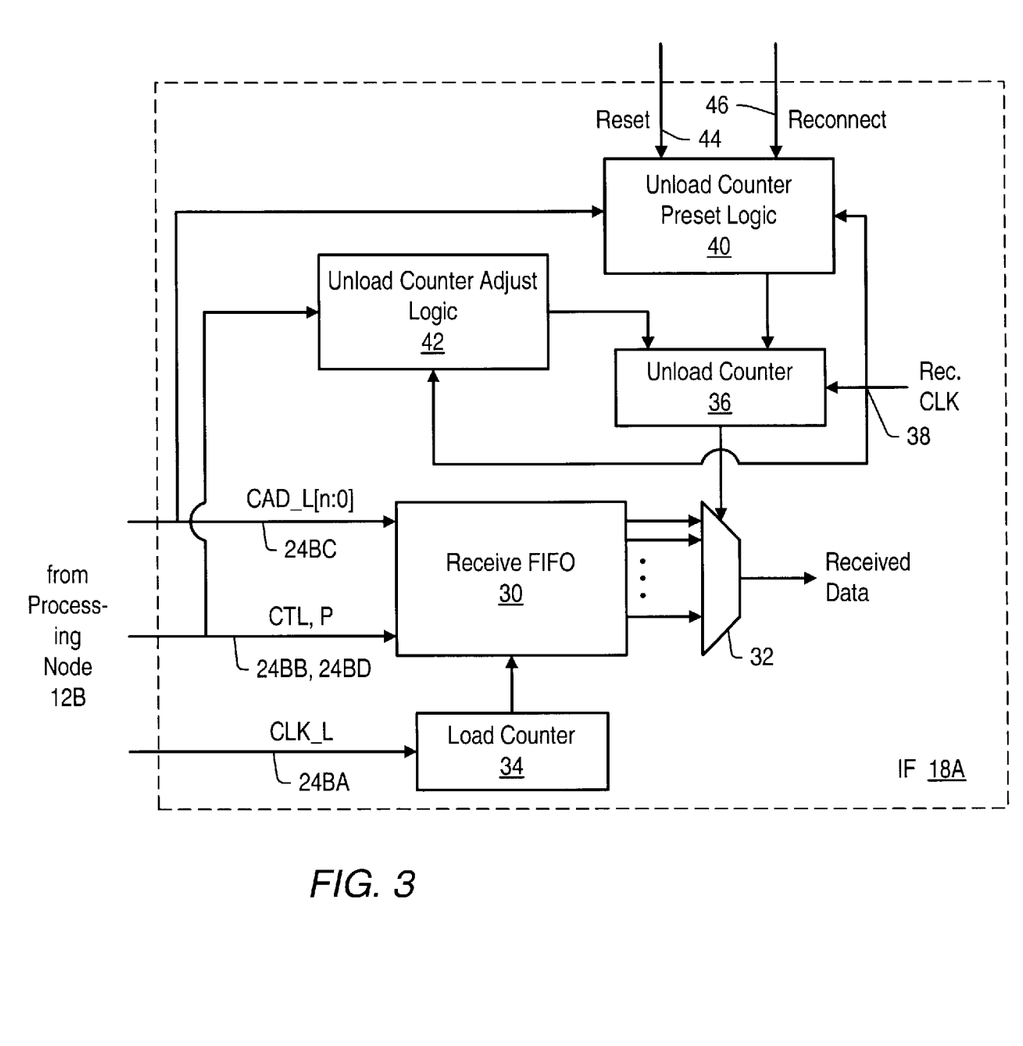
FIG. 3 is a block diagram of a portion of one embodiment of an interface logic shown in FIG. 1.

Turning next to FIG. 3, a block diagram of a portion of one embodiment of interface logic 18A is shown. Other embodiments are possible and contemplated. Other interface logic (e.g. interface logic 18B–18G shown in FIG. 1) may be configured similarly. In the embodiment of FIG. 3, interface logic 18A includes a receive FIFO 30 coupled to command/address/data bus 24BC, control line 24BB, parity line 24BD, an output mux 32, and a load counter 34. Load counter 34 is further coupled to clock line 24BA. Output mux 32 is coupled to receive selection controls from an unload counter 36, which is coupled to a receiver clock line 38, an unload counter preset logic 40, and an unload counter adjust logic 42. Unload counter adjust logic 42 is coupled to clock line 24BA and receiver clock line 38. Unload counter preset logic 40 is coupled to control/address/data bus 24BC, receiver clock line 38, a reset line 44, and a reconnect line 46.

Generally speaking, receive FIFO 30 provides a mechanism for handling variation between the clock signal provided by the transmitter (e.g. processing node 12B in FIG. 3) and the receiver clock signal. Since the clock corresponding to data transmitted on a given link is forwarded on that link, there is no requirement that the clocks employed by the various nodes have a common source. Instead, clock jitter and uncertainty between the clocks may be specified, and receive FIFO 30 may be designed with enough entries to provide time for the receiver to unload the data from the receive FIFO 30 (according to the receiver clock) before the data is overwritten by subsequently received data (placed into receive FIFO 30 according to the clock signal provided on clock line 24BA).

Load counter 34 is clocked by the clock signal upon clock line 24BA (the transmitter clock) and selects the next entry within receive FIFO 30 to store the bit time of data being transmitted. As mentioned above, in one embodiment a bit time is signalled by both falling and rising edges of the clock signal. Accordingly, the load pointer maintained by load counter 34 may be incremented upon each falling edge and each rising edge of the transmitter clock signal. Load counter 34 provides the load pointer to receive FIFO 30, which updates the indicated entry with the received data. More particularly, the data transmitted upon command/address/data bus 24BC, control line 24BB, and parity line 24BD may be stored into the selected entry.

Each entry within receive FIFO 30 provides the data stored therein to output mux 32. Unload counter 36 maintains an unload pointer indicating which entry within receive FIFO 30 is the next entry to be processed by interface logic 18A. Unload counter 36 is clocked by the receiver clock signal. As mentioned above, in one embodiment a bit time is signalled by both falling and rising edges of the clock signal. Accordingly, the unload pointer maintained by unload counter 34 may be incremented upon each falling edge and each rising edge of the receiver clock signal. The unload pointer acts as a selection control for output mux 32, selecting a bit time of information to be processed by interface logic 18A.

Interface logic 18A may unload bit times of information from receive FIFO 30 and place the information into one of a set of buffers (not shown) based upon the type of packet within which the bit time is included. In this manner, a packet may be assembled in the corresponding buffer from its component bit times as received in receive FIFO 30. Alternatively, a set of receive FIFOs may be included as the buffers for various types of packets and each bit time of information may be stored into the appropriate receive buffer. In such an alternative, the unload counter advances when a packet is processed and forwarded to a destination, as opposed to upon each edge of the receiver clock signal.

Upon reset, the load and unload counters are preset to "safe" values (so that the unload pointer trails the load pointer through receive FIFO 30 by enough entries to ensure that an entry is validly loaded from the link before being processed by the receive logic) based upon the specified clock uncertainty between the transmitter clock signal and the receiver clock signal and further based upon the asynchronous nature of the transmitter and receiver clock signals. The clock uncertainty may be predetermined, and hence may be factored into the preset values as a constant. However, differences due to the asynchronous clocks may indicate different preset values and may not be predetermined. More particularly, since data is transferred upon both the rising and falling edges of the clock signal, a particular data transferred on the rising edge of the transmitter clock signal may actually be detectable on the falling edge of the receiver clock signal. In order to compensate for this possibility, unload counter preset logic 40 is provided.

Unload counter preset logic 40 monitors a preset sequence sent by the transmitter upon command/address/data bus 24BC during reset, as indicated by a reset signal upon reset line 44. Unload counter present logic 40 samples the preset sequence according to the receiver clock, and determines if the receiver clock is out of phase with the transmitter clock by enough to warrant separating the load and unload pointers by an additional entry within FIFO buffer 30. Accordingly, load counter 34 may be preset to indicate the first entry within FIFO buffer 30 (e.g. may be preset to zero) and the unload counter may be preset based upon the preset sequence. Additional details regarding one embodiment of unload counter preset logic 40 are provided further below.

Additionally, there may be frequency variation between the transmitter and receiver clocks. Unload counter adjust logic 42 is provided to monitor for frequency differences and to adjust the unload pointer to account for the frequency differences. Generally, unload counter adjust logic 42 is configured to adjust the unload pointer to ensure that neither pointer overruns the other in traversing the entries of the buffer. Additional details regarding one embodiment of unload counter adjust logic 42 are provided further below.

Receive FIFO 30 may employ any number of entries. A minimum number of entries may be determined from the clock uncertainty specification (as a function of the bit time, which may derived from the clock period). For example, if clock jitter is+/−1 nanosecond (ns), or a 2 ns clock uncertainty, and a bit time is 1 ns, then a minimum number of entries may be 4 (2 for the clock uncertainty, 1 for clock sample error, and one entry to be processed). While a receive FIFO 30 is shown, generally a buffer of any suitable construction may be used.

Figure 4:
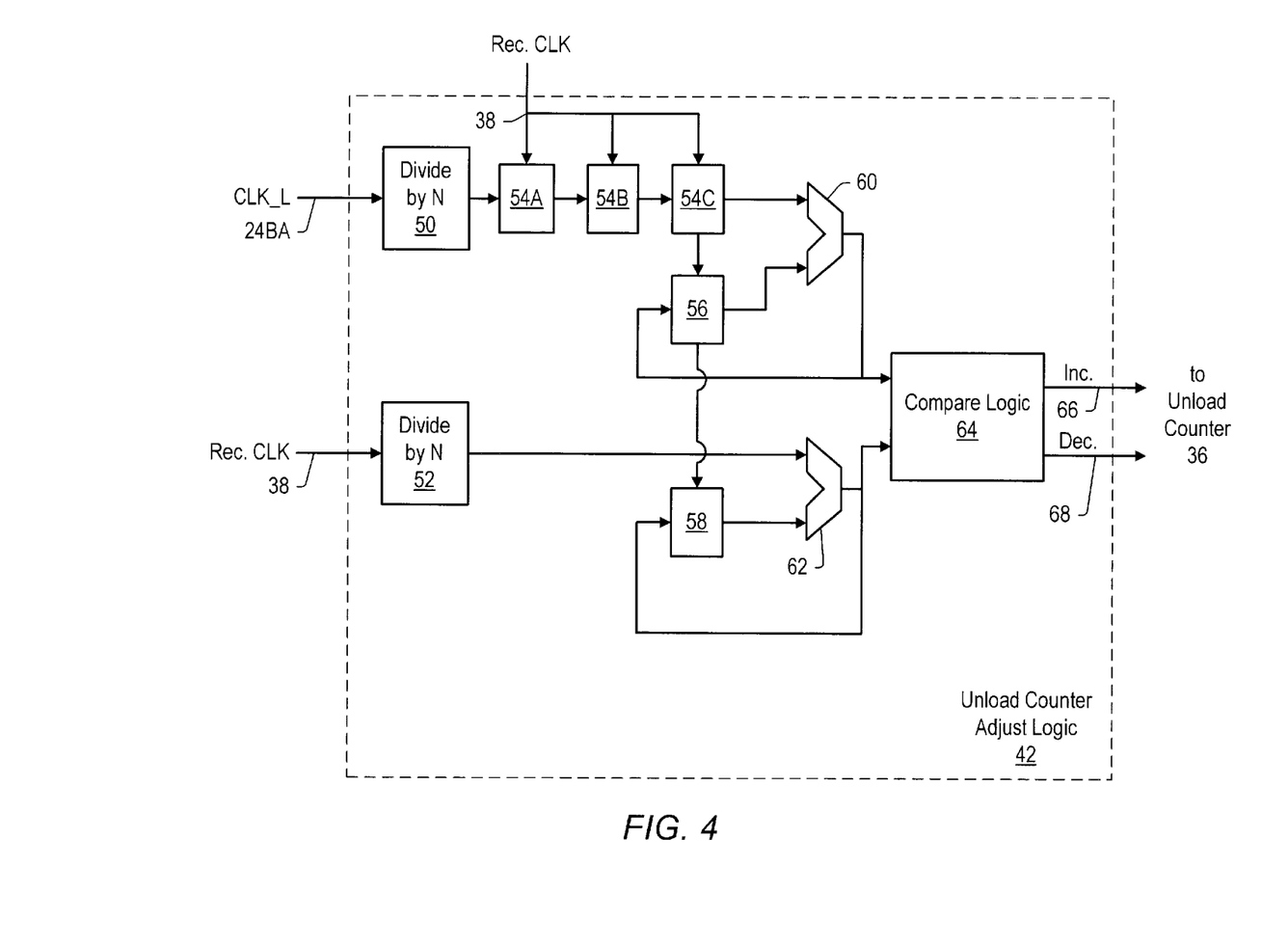
FIG. 4 is a block diagram of one embodiment of an unload counter adjust logic illustrated in FIG. 3.

Turning now to FIG. 4, a block diagram illustrating one embodiment of unload counter adjust logic 42 is shown. Other embodiments are possible and contemplated. In the embodiment of FIG. 4, unload counter adjust logic 42 includes divide by N circuits 50 and 52, flops 54A–54C, 56, and 58, adder circuits 60 and 62, and compare logic 64. Divide by N circuit 50 is coupled to receive the transmitter clock signal upon clock line 24BA and to a series connection of flops 54A–54C. Divide by N circuit 52 is coupled to receive the receiver clock signal on receiver clock line 38, and is further coupled to adder circuit 62. Flops 54A–54C are clocked by the receiver clock signal on receiver clock line 38, and the output of flop 54C is coupled to adder circuit 60. Flop 56 is coupled to adder circuit 60, which is further coupled to compare logic 64. Flop 58 is coupled to adder circuit 62, which is also further coupled to compare logic 64. Compare logic 64 is coupled to provide increment and decrement controls to unload counter 36 via lines 66 and 68.

Generally, the combination of flop 56 and adder circuit 60 forms a pulse counter for counting pulses corresponding to the transmitter clock signal. Similarly, the combination of flop 58 and adder circuit 62 forms a pulse counter for counting pulses corresponding to the receiver clock signal. The pulse counts over a period of time are proportional to the frequencies of each clock.

Compare logic 64 compares the pulse counts provided by each pulse counter, and adjusts the unload pointer provided by unload counter 36 accordingly. In this manner, differences in frequency may be accounted for by adjusting the unload pointer (in addition to the increments performed by unload counter 36). More particularly, the unload pointer may be incremented (if the frequency of the transmitter clock is greater than the frequency of the receiver clock, as indicated by the output of adder circuit 60 exceeding the output of adder circuit 62) or decremented (if the frequency of the transmitter clock is less than the frequency of the receiver clock, as indicated by the output of adder circuit 62 exceeding the output of adder circuit 60). If the unload pointer is incremented by unload counter adjust logic 42, interface logic 18A also simultaneously processes two entries within receive FIFO 30 so that no data is lost. In another embodiment, a staging buffer is provided which is loaded with the next entry to be unloaded by the unload pointer each processing period (e.g. the entry selected by the unload pointer plus one). If the unload pointer is to be incremented, the staging buffer may be processed as the next entry. The staging buffer may be processed on subsequent unload periods (and continue to be loaded with the next entry) until a synchronization condition allows a return to the values pointed to by the unload pointer (e.g. receipt of a NOP or cyclical redundancy check (CRC) data). Upon synchronization, the unload pointer may be adjusted as described and processing of the entry selected by the unload pointer may be performed. Decrementing the unload pointer is equivalent to holding the unload pointer at a steady value for a clock cycle (since unload counter 36 is incrementing the pointer at the same time). Incrementing the unload pointer is equivalent to double incrementing the unload pointer (since unload counter 36 is incrementing the pointer at the same time). Additionally, upon adjusting the unload pointer, the pulse counts may be reset. Compare logic 64 may output a clear signal to flops 56 and 58, for example, to clear the flops when an adjust of the unload pointer is made.

Since the transmitter clock signal and receiver clock signal are expected to be of approximately the same frequency, divide by N circuits 50 and 52 are used to divide the frequency of each clock signal. In this manner, pulses are detectable for each clock signal by the pulse counters (which operate at the frequency of the receiver clock). In other words, the pulses counted by the pulse counters are pulses from a wave form derived from the clock signals. The divisor for the divide by N circuits may be based upon the maximum difference which is expected to occur between the transmitter clock and the receiver clock. For example, divide by two may be selected.

Additionally, it is possible that sampling the transmitter clock signal according to the receiver clock signal may lead to metastability of the sampling flops. Flops 54A–54C provide a synchronization of the transmitter clock to the receiver clock, reducing the likelihood of experiencing metastability.

As used herein, a flop is an edge-triggered storage element. In other words, the flop captures a value responsive to an edge of the clock signal (e.g. the rising edge). Other storage elements (e.g. latches, registers, etc.) may be substituted as desired. Additionally, as an alternative to incrementing or decrementing the unload pointer, compare logic 64 may provide a new value for the unload pointer based upon its current value. Still further, while the present embodiment describes incrementing the unload pointer according to the receive clock signal, the unload pointer may be decremented. In such an embodiment, the unload pointer is decremented if the pulse count corresponding to the transmitter clock exceeds the pulse count corresponding to the receiver clock, and is incremented if the pulse count corresponding to the receiver clock exceeds the pulse count corresponding to the transmitter clock.

It is noted that the minimum size of receive FIFO 30 may be increased to provide additional entries if the frequencies of the transmitter are allowed to vary. The preset of the unload pointer may be increased by one additional entry to allow for uncertainty in the synchronizer flops 54A–54C. Furthermore, two additional entries may be employed within receive FIFO 30 (one additional entry to allow for the adjustment of the unload pointer and one additional entry to account for the increase in the present value as measured from the load pointer).

Figure 5:
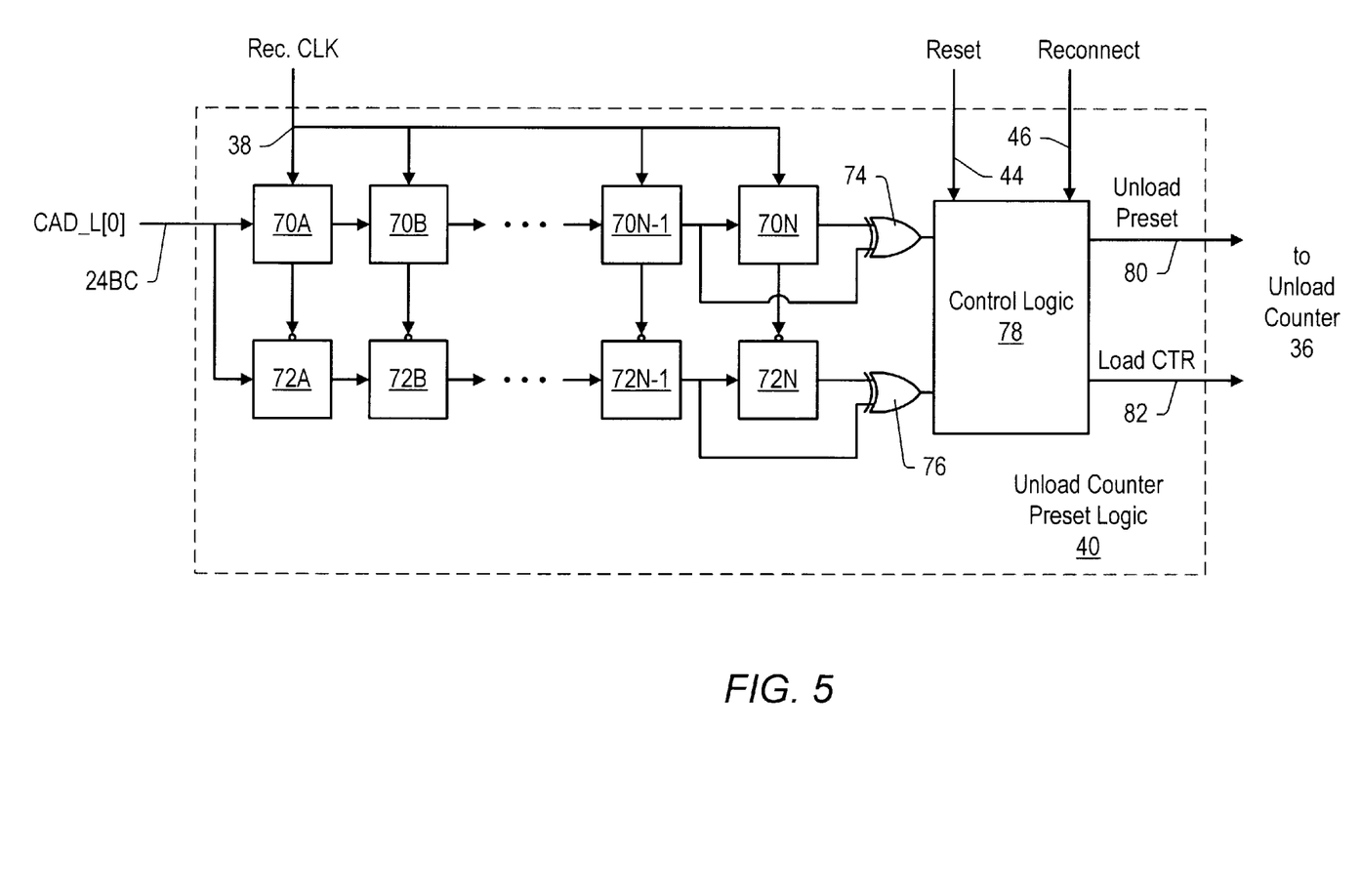
FIG. 5 is a block diagram of one embodiment of an unload counter preset logic illustrated in FIG. 3.

Turning now to FIG. 5, a block diagram of one embodiment of unload counter preset logic 40 is shown. Other embodiments are possible and contemplated. In the embodiment of FIG. 5, unload counter preset logic 40 includes a first series of flops 70A–70N, a second series of flops 72A–72N, XOR gates 74 and 76, and a control logic 78. Flops 70A and 72A are coupled to a portion of control/address/data bus 24BC (e.g. bit zero of the bus). Flops 70A–70N and 72A–72N are coupled to receiver clock line 38. Flops 70A–70N are clocked on the rising edge of the receiver clock signal, and flops 72A–72N are clocked on the falling edge of the receiver clock signal. Flops 70N-1 and 70N are coupled to XOR 74, and flops 72N-1 and 72N are similarly coupled to XOR gate 76. XOR gates 74 and 76 are further coupled to control logic 78, which is coupled to provide an unload preset value on lines 80 and a load counter signal on line 82 to unload counter 36. Additionally, control logic 78 is coupled to receive a reset signal on reset line 44 and a reconnect signal on reconnect line 46.

During reset, the transmitter of signals on control/address/data bus 24BC transmits a preset sequence on bit zero of control/address/data bus 24BC. Generally, the preset sequence comprises a sequence of values which may be used by the receiver to determine the phase difference between the transmitter clock and the receiver clock. For example, the preset sequence may comprise a sequence of binary zeros followed by a sequence of binary ones. More particularly, the sequence may, in one embodiment, comprise a sequence of binary zeros sufficient to clear the series of flops 70A–70N and 72A–72N followed by a sequence of three binary zeros and a sequence of three binary ones. The sequence may be transmitted during consecutive bit times, and edge detectors may be employed to detect the transition from the sequence of binary zeros to the sequence of binary ones. In one particular embodiment, the transition from zeros to ones occurs on the rising edge The connection of the outputs of flops 70N-1 and 70N to XOR gate 74 provides one edge detector circuit, while the connection of the outputs of flops 72N-1 and 72N to XOR gate 76 provides another edge detect circuit. The output of XOR gate 74 is a one when the outputs of flops 70N-1 and 70N differ (e.g. when flop 70N-1 stores a binary one and flop 70N stores a binary zero). Similarly, the output of XOR gate 76 is a one when the outputs of flops 72N-1 and 72N differ (e.g. when flop 72N-1 stores a binary one and flop 72N stores a binary zero). Accordingly, when a transition from a binary zero to a binary one occurs (or vice versa) in a stream of bits sampled by the series of flops, the output of the edge detector will be a one once the transition reaches the end of the series of flops. Since flops 70A–70N sample bit zero of control/address/data bus 24BC on the rising edge of the receiver clock signal and flops 72A–72N sample bit zero of control/address/data bus 24BC on the falling edge of the receiver clock signal, one of the two series of flops will detect the transition in the preset sequence one half phase of the receiver clock signal ahead of the other. Accordingly, since the preset sequence is transmitted according to rising and falling edges of the transmitter clock, the phase difference between the transmitter clock and receiver clock may be detected. The preset value for the unload pointer differs based upon whether the receiver clock and transmitter clock are out of phase or in phase with each other.

Control logic 78 receives the output of each edge detector and determines the preset value for unload counter 36. Control logic 78 begins monitoring the outputs of the edge detectors in response to the assertion of the reset signal. Depending upon which of the edge detectors detects the transition from binary zero to binary one in the preset sequence first, control logic 78 transmits one of two possible preset values. The preset values depend upon clock uncertainty and the length of the series of flops 70A–70N as well. Upon determining the preset value, control logic 78 transmits the preset value on lines 80 and asserts the load signal on line 82. In one embodiment, the preset value is given by the following formula if the rising edge detector detects the transition first (meaning the transmitting and receiving clocks are in phase):

*Unload Counter*=0−(2\*number of flops in series+clock skew) mod (number of entries in *FIFO*)

On the other hand, the present value is given by the following formula if the falling edge detector detects the transition first (meaning the transmitting and receiving clocks are out of phase):

*Unload Counter*=1−(2\*number of flops in series+clock skew) mod (number of entries in *FIFO*)

The number of flops in series is subtracted out of the preset value because the load pointer has been incrementing during the time period that the preset value is being determined. Twice the number of flops is subtracted out in the present embodiment because there are two bit times per clock (i.e. the load pointer is incremented twice per clock cycle) but the series of flops is clocked once per clock cycle. The load pointer is preset to zero upon reset.

It is noted that unload counter preset logic 40 operates in a similar fashion in response to a reconnect signal on reconnect line 46. A reconnect operation is performed when processing node 12A is exiting a power management mode. Upon entering a power management mode, processing node 12A performs a disconnect operation which indicates that processing node 12A is not monitoring the links for packets. Once the disconnect is performed, interface logic 18A may be disabled. Therefore, upon reenabling interface logic 18A via a reconnect, the load and unload pointers are preset again in a manner similar to reset.

It is noted that, while the preset sequence described above include a sequence of binary zeros followed by a sequence of binary ones, an alternative configuration may employ a sequence of binary ones followed by a sequence of binary zeros. As used herein, a "series of flops" is a set of flops which are connected in series (e.g. flops 70A–70N in FIG. 5). Bits sampled by the first flop in the series (e.g. flop 70A)

are propagated one clock cycle at a time through the series of flops until the bits arrive at the end of the series (e.g. flop 70N). The number of flops included in series of flops 70A–70N and 72A–72N may comprise any suitable number. For example, ten flops per series may be suitable.

Figure 6:
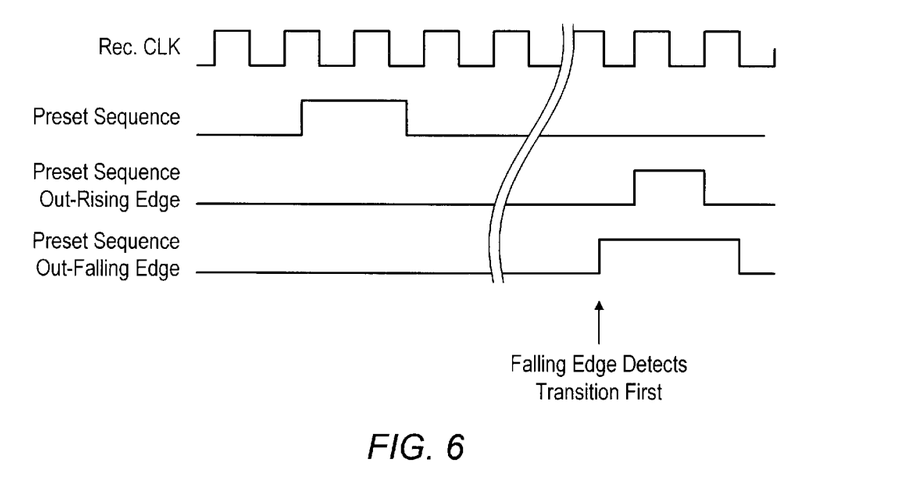
FIG. 6 is a first timing diagram illustrating operation of the unload counter preset logic illustrated in FIG. 5.
Figure 7:
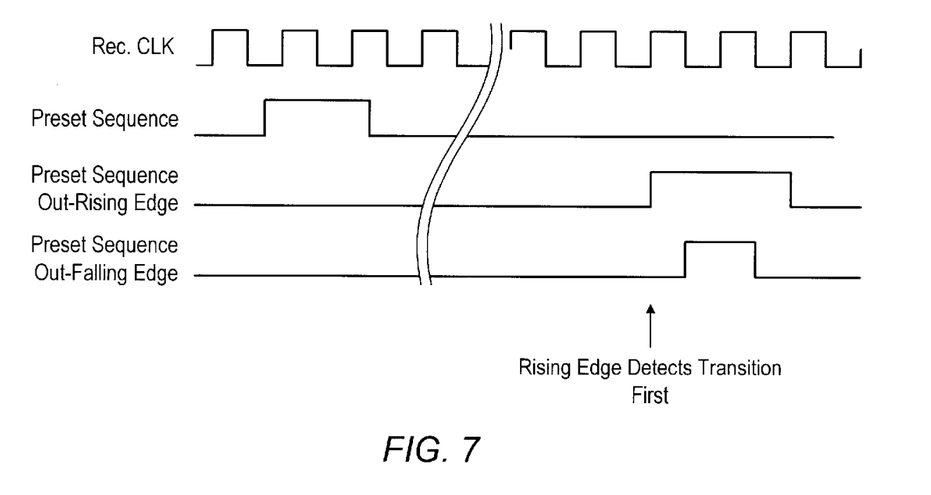
FIG. 7 is a first timing diagram illustrating operation of the unload counter preset logic illustrated in FIG. 5.

FIGS. 6 and 7 are timing diagrams illustrating two examples of the receipt of the preset sequence. In FIG. 6, the edge detector clocked by the falling edge of the receiver clock (e.g. flops 72A–72N and XOR gate 76) detects the transition first (since the first sampled binary one is at the falling edge of the receiver clock). In FIG. 7, the edge detector clocked by the rising edge of the receiver clock (e.g. flops 70A–70N and XOR gate 74) detects the transition first (since the first sampled binary one is at the rising edge of the receiver clock).

The term "line", as used herein, refers to any suitable conductor capable of carrying a signal from a transmitter to a receiver.

Numerous variations and modifications will become apparent to those skilled in the art once the above disclosure is fully appreciated. It is intended that the following claims be interpreted to embrace all such variations and modifications.

What is claimed is:

1. An interface logic comprising:
   a receive buffer coupled to receive data, wherein said receive buffer includes a plurality of storage locations, and wherein each of said plurality of storage locations is capable of storing said data;
   a load counter coupled to said receive buffer and to receive a first clock signal, wherein said load counter is configured to provide a first pointer which selects one of said plurality of storage locations to store said data, said load counter configured to modify said first pointer responsive to said first clock signal;
   an unload counter coupled to said receive buffer and to receive a second clock signal, wherein said load counter is configured to provide a second pointer which selects one of said plurality of storage locations to transmit data out of said receive buffer, said unload counter configured to modify said second pointer responsive to said second clock signal; and
   an unload counter adjust logic coupled to said unload counter and to receive said first clock signal and said second clock signal, wherein said unload counter adjust logic is configured to modify said second pointer responsive to differences between said first and second clock signals.

2. The interface logic as recited in claim 1 wherein said unload counter adjust logic comprises a pair of pulse counters, wherein a first one of said pair of pulse counters is configured to count pulses corresponding to said first clock signal, and wherein a second one of said pair of pulse counters is configured to count pulses corresponding to said second clock signal.

3. The interface logic as recited in claim 2 wherein said unload counter adjust logic is configured to decrement said second pointer if a number of pulses of said second clock signal exceeds a number of pulses of said first clock signal.

4. The interface logic as recited in claim 2 wherein said unload counter adjust logic is configured to increment said second pointer if a number of pulses of said first clock signal exceeds a number of pulses of said second clock signal.

5. The interface logic as recited in claim 2 wherein said unload counter adjust logic comprises a comparator logic configured to compare an output of said pair of pulse counters and generate increment/decrement controls.

6. The interface logic as recited in claim 2 wherein said unload counter adjust logic further comprises a series of flops coupled to said first one of said pair of pulse counters, said series of flops coupled to synchronize said first clock signal to said second clock signal.

7. The interface logic as recited in claim 2 further comprising a pair of divide by N circuits configured to divide a frequency of said first clock signal and a second clock signal by N, said pair of divide by N circuits coupled to provide signals to said pair of pulse counters for pulse counting.

8. The interface logic as recited in claim 1 wherein said load counter is configured to increment said first pointer responsive to both a rising edge and a falling edge said first clock signal, and wherein said unload counter is configured to increment said second pointer responsive to both a rising edge and a falling edge said second clock signal.

9. The interface logic as recited in claim 1 further comprising an unload counter preset logic configured to preset said second pointer responsive to a reset signal and to a preset sequence transmitted to said receive buffer responsive to said reset signal.

10. The interface logic as recited in claim 9 wherein said preset sequence comprises a sequence of binary zeros and a sequence of binary ones, and wherein said unload counter preset logic comprises an edge detector configured to detect a transition from one of said sequence of binary zeros and said sequence of binary ones to another one of said sequence of binary zeros and a sequence of binary ones.

11. The interface logic as recited in claim 10 wherein data is transmitted on both a rising edge and a falling edge of first and second clock signals, and wherein said unload counter preset logic comprises two edge detectors, and wherein one of said edge detectors is coupled to a series of flops clocked by said rising edge of said second clock signal, and wherein another one of said edge detectors is coupled to a series of flops clocked by said falling edge of said second clock signal.

12. The interface logic as recited in claim 11 wherein said unload counter preset logic is configured to determine a preset for said second pointer based upon which of said two edge detectors detects said transition first.

13. A method for operating a receive buffer, the method comprising:
   modifying a load pointer responsive to a first clock signal;
   modifying an unload pointer responsive to a second clock signal;
   detecting differences between said first clock signal and said second clock signal; and
   modifying said unload pointer responsive to said detecting.

14. The method as recited in claim 13 wherein said modifying comprises incrementing said unload pointer if said detecting detects that said unload pointer is being modified less frequently than said load pointer.

15. The method as recited in claim 13 wherein said modifying comprises decrementing said unload pointer if said detecting detects that said unload pointer is being modified more frequently than said load pointer.

16. The method as recited in claim 13 wherein said detecting comprises:
   counting pulses corresponding to said first clock signal; and
   counting pulses corresponding to said second clock signal; and
   comparing a number of said pulses counted in said counting pulses corresponding to said first clock signal to a number of said pulses counted in said counting pulses corresponding to said second clock signal.

17. The method as recited in claim 16 wherein said detecting further comprises:
deriving said pulses corresponding to said first clock signal from said first clock signal; and
deriving said pulses corresponding to said second clock signal from said second clock signal.

18. The method as recited in claim 17 wherein said deriving said pulses corresponding to said first clock signal from said first clock signal comprises dividing a frequency of said first clock signal by N, and wherein said deriving said pulses corresponding to said second clock signal from said second clock signal comprises dividing a frequency of said second clock signal by N.

19. The method as recited in claim 13 wherein said modifying a load pointer responsive to a first clock signal comprises:
incrementing said load pointer responsive to a rising edge of said first clock signal; and
incrementing said load pointer responsive to a falling edge of said first clock signal;
and wherein said modifying an unload pointer responsive to a second clock signal comprises:
incrementing said unload pointer responsive to a rising edge of said second clock signal; and
incrementing said unload pointer responsive to a falling edge of said second clock signal.

20. The method as recited in claim 13 further comprising:
receiving an indication that a reset is occurring;
receiving a preset sequence responsive to said reset;
detecting said preset sequence responsive to said second clock signal; and
presetting said unload pointer responsive to said detecting.

21. The method as recited in claim 20 further comprising transmitting said preset sequence on both a rising edge and a falling edge of a clock signal.

22. The method as recited in claim 21 wherein said preset sequence comprises a sequence of binary zeros and a sequence of binary ones, and wherein said detecting comprises detecting a transition from one of said sequence of binary zeros and said sequence of binary ones to another one of said sequence of binary zeros and said sequence of binary ones.

23. A computer system comprising:
a first processing node including an interface logic comprising:
a receive buffer coupled to receive data, wherein said receive buffer includes a plurality of storage locations, and wherein each of said plurality of storage locations is capable of storing said data;
a load counter coupled to said receive buffer and to receive a first clock signal, wherein said load counter is configured to provide a first pointer which selects one of said plurality of storage locations to store said data, said load counter configured to modify said first pointer responsive to said first clock signal;
an unload counter coupled to said receive buffer and to receive a second clock signal, wherein said load counter is configured to provide a second pointer which selects one of said plurality of storage locations to transmit data out of said receive buffer, said unload counter configured to modify said second pointer responsive to said second clock signal; and
an unload counter adjust logic coupled to said unload counter and to receive said first clock signal and said second clock signal, wherein said unload counter adjust logic is configured to modify said second pointer responsive to differences between said first and second clock signals; and
a second processing node coupled to said first processing node, wherein said second processing node is configured to provide said first clock signal and said data.

24. The computer system as recited in claim 23 wherein said second processing node includes a second interface logic comprising:
a second receive buffer coupled to receive second data, wherein said second receive buffer includes a second plurality of storage locations, and wherein each of said second plurality of storage locations is capable of storing said second data;
a second load counter coupled to said second receive buffer and to receive a third clock signal, wherein said second load counter is configured to provide a third pointer which selects one of said second plurality of storage locations to store said second data, said second load counter configured to modify said third pointer responsive to said third clock signal;
a second unload counter coupled to said second receive buffer and to receive a fourth clock signal, wherein said second load counter is configured to provide a fourth pointer which selects one of said second plurality of storage locations to transmit second data out of said second receive buffer, said unload counter configured to modify said fourth pointer responsive to said fourth clock signal; and
a second unload counter adjust logic coupled to said second unload counter and to receive said third clock signal and said fourth clock signal, wherein said second unload counter adjust logic is configured to modify said fourth pointer responsive to differences in said third and fourth clock signals.

25. The computer system as recited in claim 24 wherein said first processing node is configured to provide said third clock signal and said second data.

* * * * *